US012610880B2

(12) United States Patent
Conboy et al.

(10) Patent No.: US 12,610,880 B2
(45) Date of Patent: *Apr. 28, 2026

(54) SYSTEM AND METHOD FOR DETERMINING SEED PLACEMENT DURING A SEED-PLANTING OPERATION

(71) Applicant: CNH Industrial America LLC, New Holland, PA (US)

(72) Inventors: Michael Christopher Conboy, Chicago, IL (US); Mario Rathmanner, Baden (AT); Michael Pregesbauer, Baden (AT)

(73) Assignee: CNH Industrial America LLC, New Holland, PA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/644,616

(22) Filed: Apr. 24, 2024

(65) Prior Publication Data

US 2025/0331448 A1 Oct. 30, 2025

(51) Int. Cl.
*A01C 14/00* (2006.01)
*G01S 13/88* (2006.01)

(52) U.S. Cl.
CPC ............ *A01C 14/00* (2013.01); *G01S 13/885* (2013.01)

(58) Field of Classification Search
None
See application file for complete search history.

(56) References Cited

U.S. PATENT DOCUMENTS

| | | | |
|---|---|---|---|
| 8,311,696 B2 | 11/2012 | Reeve | |
| 8,849,523 B1 * | 9/2014 | Chan .................... | A01G 25/167 |
| | | | 701/50 |

| | | |
|---|---|---|
| 10,704,233 B2 | 7/2020 | Dusha |
| 10,895,636 B2 | 1/2021 | Gonzales Valdes et al. |
| 11,129,324 B2 | 9/2021 | Weigel |

(Continued)

FOREIGN PATENT DOCUMENTS

| | | | |
|---|---|---|---|
| CN | 208705324 U | 4/2019 | |
| CN | 112650219 A | 4/2021 | |
| WO | WO-2020231934 A1 * | 11/2020 | ........... A01B 3/1112 |

OTHER PUBLICATIONS

Co-Pending U.S. Appl. No. 18/644,605, filed Apr. 24, 2024.
Co-Pending U.S. Appl. No. 18/644,622 filed Apr. 24, 2024.

*Primary Examiner* — Daniel L Greene

(74) *Attorney, Agent, or Firm* — Dority & Manning, P.A.

(57) ABSTRACT

A seed-planting implement includes a computing system configured to control a first radar sensor to scan a sub-surface detection zone of a field before a seed is deposited. Furthermore, the computing system is configured to receive a plurality of first radar data points. Additionally, the computing system is configured to populate a first matrix with the plurality of first data points. After controlling the first radar sensor, the computing system is configured to control the second radar sensor to scan the sub-surface detection zone of the field after the seed is deposited. Moreover, the computing system is configured to receive a plurality of second radar data points. In addition, the computing system is configured to populate a second matrix with the plurality of second data points. Furthermore, the computing system is configured to determine the location of the seed based on a determined correlation between the first and second matrices.

20 Claims, 6 Drawing Sheets

(56)  References Cited

U.S. PATENT DOCUMENTS

| | | | |
|---|---|---|---|
| 11,163,053 | B2 | 11/2021 | Shayovitz et al. |
| 11,602,095 | B2 | 3/2023 | Hubner et al. |
| 11,623,494 | B1 | 4/2023 | Arnicar et al. |
| 2014/0379228 | A1* | 12/2014 | Batcheller ............. A01C 7/201 |
| | | | 701/50 |
| 2021/0084807 | A1 | 3/2021 | Obrist |
| 2021/0190754 | A1* | 6/2021 | Stoller .................... A01C 7/20 |
| 2024/0090363 | A1* | 3/2024 | Lichtenwalner, Jr. ...................... |
| | | | A01C 21/00 |

* cited by examiner

SYSTEM AND METHOD FOR DETERMINING SEED PLACEMENT DURING A SEED-PLANTING OPERATION

FIELD OF THE INVENTION

The present disclosure generally relates to seed-planting implements and, more particularly, to systems and methods for determining seed placement during a seed-planting operation being performed by a seed-planting implement.

BACKGROUND OF THE INVENTION

Modern farming practices strive to increase yields of agricultural fields. In this respect, seed-planting implements are towed behind a tractor or other work vehicle to disperse seed throughout a field. For example, many seed-planting implements include several laterally spaced row units, with each row unit forming a row of planted seeds within the field. In this respect, each row unit typically includes a furrow opening assembly (e.g., a disk opener(s)) that forms a furrow or trench in the soil. Furthermore, each row unit generally includes a seed-dispensing device (e.g., a seed meter and associated seed tube) that deposits the seeds into the furrow. After deposition of the seeds, a furrow closing assembly (e.g., a pair of closing disks or wheels) may close the furrow in the soil.

The placement of the seeds within the soil of a field is an important parameter for optimizing the crop yield of the field. For example, when the seeds are placed within the soil at too deep of or too shallow of a depth, the resulting plants may have a reduced crop yield. In this respect, systems and methods for determining seed placement during a seed-planting operation have been developed. While such systems and methods work well, further improvements are needed.

Accordingly, an improved system and method for determining seed placement during a seed-planting operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a seed-planting implement including a frame, a disk opener rotatably coupled to the frame, a gauge wheel adjustably coupled to the frame, first and second radar sensors supported on the frame, and a computing system communicatively coupled to the first and second radar sensors. In this respect, the computing system is configured to control the first radar sensor such that the first radar sensor scans a sub-surface detection zone of a field before a seed is deposited within the sub-surface detection zone. Furthermore, the computing system is configured to receive first radar sensor data including a plurality of first radar data points from the first radar sensor, with each first radar data point corresponding to a parameter associated with a reflection of an output signal emitted by the first radar sensor from a given location within the sub-surface detection zone. Additionally, the computing system is configured to populate a first matrix including a plurality of cells with the plurality of first data points such that each first data point is placed within a cell corresponding to the given location within the sub-surface detection zone. After controlling the first radar sensor, the computing system is configured to control the second radar sensor such that the second radar sensor scans the sub-surface detection zone of the field after the seed is deposited within the sub-surface detection zone. Moreover, the computing system is configured to receive second radar sensor data including a plurality of second radar data points from the second radar sensor, with each second radar data point corresponding to a parameter associated with a reflection of an output signal emitted by the second radar sensor from a given location within the sub-surface detection zone. In addition, the computing system is configured to populate a second matrix including a plurality of cells with the plurality of second data points such that each second data point is placed within a cell corresponding to the given location within the sub-surface detection zone. Furthermore, the computing system is configured to determine a correlation between the first and second matrices and determine a location of the seed based on determined correlation between the first and second matrices.

In another aspect, the present subject matter is directed to a system for determining seed placement during a seed-planting operation. The system includes first and second radar sensors and a computing system communicatively coupled to the first and second radar sensors. In this respect, the computing system is configured to control the first radar sensor such that the first radar sensor scans a sub-surface detection zone of a field before a seed is deposited within the sub-surface detection zone. Furthermore, the computing system is configured to receive first radar sensor data including a plurality of first radar data points from the first radar sensor, with each first radar data point corresponding to a parameter associated with a reflection of an output signal emitted by the first radar sensor from a given location within the sub-surface detection zone. Additionally, the computing system is configured to populate a first matrix including a plurality of cells with the plurality of first data points such that each first data point is placed within a cell corresponding to the given location within the sub-surface detection zone. After controlling the first radar sensor, the computing system is configured to control the second radar sensor such that the second radar sensor scans the sub-surface detection zone of the field after the seed is deposited within the sub-surface detection zone. Moreover, the computing system is configured to receive second radar sensor data including a plurality of second radar data points from the second radar sensor, with each second radar data point corresponding to a parameter associated with a reflection of an output signal emitted by the second radar sensor from a given location within the sub-surface detection zone. In addition, the computing system is configured to populate a second matrix including a plurality of cells with the plurality of second data points such that each second data point is placed within a cell corresponding to the given location within the sub-surface detection zone. Furthermore, the computing system is configured to determine a correlation between the first and second matrices and determine a location of the seed based on determined correlation between the first and second matrices.

In a further aspect, the present subject matter is directed to a method for determining seed placement during a seed-planting operation. The method includes controlling, with a computing system, a first radar sensor such that the first radar sensor scans a sub-surface detection zone of a field before a seed is deposited within the sub-surface detection zone. Additionally, the method includes receiving, with the computing system, first radar sensor data including a plurality of first radar data points from the first radar sensor, with each first radar data point corresponding to a parameter associated with a reflection of an output signal emitted by the first radar sensor from a given location within the sub-surface detection zone. Moreover, the method includes populating, with the computing system, a first matrix including a plurality of cells with the plurality of first data points such that each first data point is placed within a cell corresponding to the given location within the sub-surface detection zone. After controlling the first radar sensor, the method includes controlling, with the computing system, a second radar sensor such that the second radar sensor scans the sub-surface detection zone of the field after the seed is deposited within the sub-surface detection zone. In addition, the method includes receiving, with the computing system, second radar sensor data including a plurality of second radar data points from the second radar sensor, with each second radar data point corresponding to a parameter associated with a reflection of an output signal emitted by the second radar sensor from a given location within the sub-surface detection zone. Furthermore, the method includes populating, with the computing system, a second matrix including a plurality of cells with the plurality of second data points such that each second data point is placed within a cell corresponding to the given location within the sub-surface detection zone. Additionally, the method includes determining, with the computing system, a correlation between the first and second matrices and determining, with the computing system, a location of the seed based on determined correlation between the first and second matrices. Moreover, the method includes controlling, with the computing system, an operation of the seed-planting implement based on the determined location of the seed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
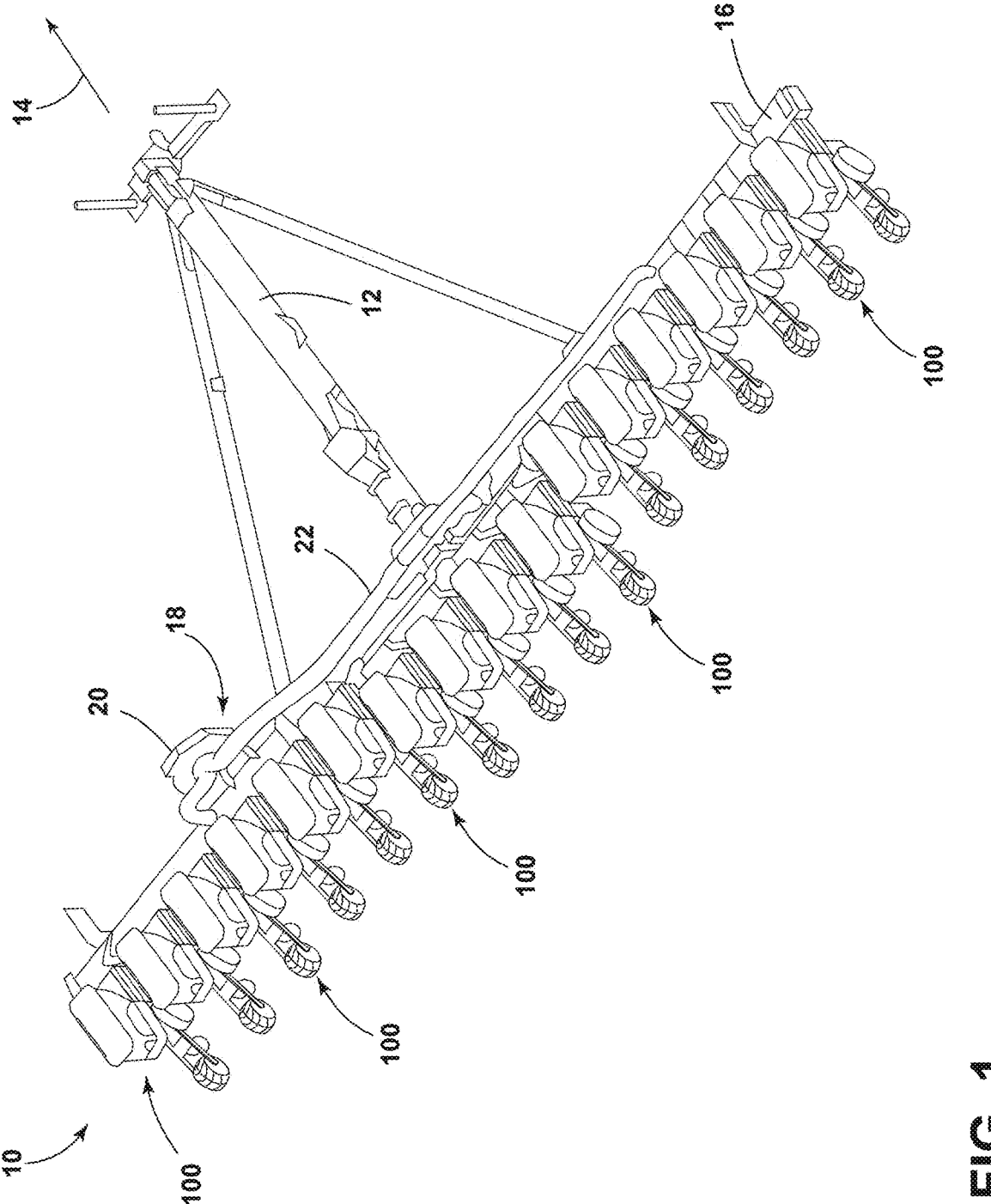
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for determining seed placement during a seed-planting operation. Specifically, in several embodiments, a computing system is configured to control a first radar sensor such that the first radar sensor scans a sub-surface detection zone of a field before a seed is deposited within the sub-surface detection zone. Furthermore, the computing system is configured to first radar sensor data including a plurality of first radar data points from the first radar sensor. Each first radar data point, in turn, corresponds to a parameter associated with a reflection of an output signal emitted by the first radar sensor from a given location within the sub-surface detection zone. Additionally, the computing system is configured to populate a first matrix including a plurality of cells with the plurality of first data points such that each first data point is placed within a cell corresponding to the given location within the sub-surface detection zone. After controlling the first radar sensor, the computing system is configured to control a second radar sensor such that the second radar sensor scans the sub-surface detection zone of the field after the seed is deposited within the sub-surface detection zone. Moreover, the computing system is configured to receive second radar sensor data including a plurality of second radar data points from the second radar sensor. Each second radar data point, in turn, corresponds to a parameter associated with a reflection of an output signal emitted by the second radar sensor from a given location within the sub-surface detection zone. In addition, the computing system is configured to populate a second matrix including a plurality of cells with the plurality of second data points such that each second data point is placed within a cell corresponding to the given location within the sub-surface detection zone.

Thereafter, the computing system is configured to determine the location of the seed based on the correlation between the first and second matrices. For example, the computing system may determine a plurality of correlation values, with each correlation value being indicative of the correlation between the parameter of a given cell of the first matrix and the parameter of a cell of at a corresponding location within the second matrix. Thereafter, the computing system may determine the location of the seed based on the location of the cells having the minimum correlation value within the first and the second matrices. That is, the location of seed may be determined to be at a location within the soil corresponding to the location of the pair of cells in the first and second matrices having the lowest correlation value. Moreover, the correlation values also allow for clutter in the radar data to be removed.

Determining seed placement within the soil of a field using the correlation between first and second matrices generated from return signals received from a first radar sensor positioned forward of the furrow and a second radar sensor positioned aft of the furrow, respectively, improves the operation of the seed-panting implement. More specifically, analyzing radar data to determine seed placement is highly computationally intensive. However, as described above, with the disclosed system and method, matrices are formed from the radar data and the correlation between the corresponding cells in the matrices are determined. This allows clutter to be removed from the radar data and the placement of the seeds to be identified in a more computationally efficient manner, thereby allowing the seed-planting implement to be adjusted quickly in response to changes in seed placement such that the seeds are more accurately placed within the soil. More accurate seed placement, in turn, results in improved crops yields.

Referring now to the drawings, FIG. 1 illustrates a perspective view of one embodiment of a seed-planting implement 10. In the illustrated embodiment, the seed-planting implement 10 is configured as a planter. However, in alternative embodiments, the seed-planting implement 10 may generally correspond to any suitable seed-planting equipment or implement, such as a seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to the aft end of the tow bar 12. More specifically, the toolbar 16 is configured to support and/or couple to one or more components of the seed-planting implement 10. For example, the toolbar 16 is configured to support one or more seed-planting units or row units 100. As will be described below, each row unit 100 is configured to form a furrow having a selected depth within the soil of the field. Thereafter, each row unit 100 deposits seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a vacuum system 18. In general, the vacuum system 18 is configured to supply vacuum pressure to the individual row units 100. As such, the vacuum system 18 may include a fan or other pressurized air source 20 and a plurality of vacuum conduits 22 extending between the fan 20 and the row units 100. In this respect, the vacuum pressure generated by the fan 20 may be used to pick up seeds onto the seed meters (not shown) of the individual row units 100. However, the seeds may be provided to the row units 100 in any other suitable manner. For example, in some alternative embodiments, the seed meters may be pressure-based.

Figure 2:
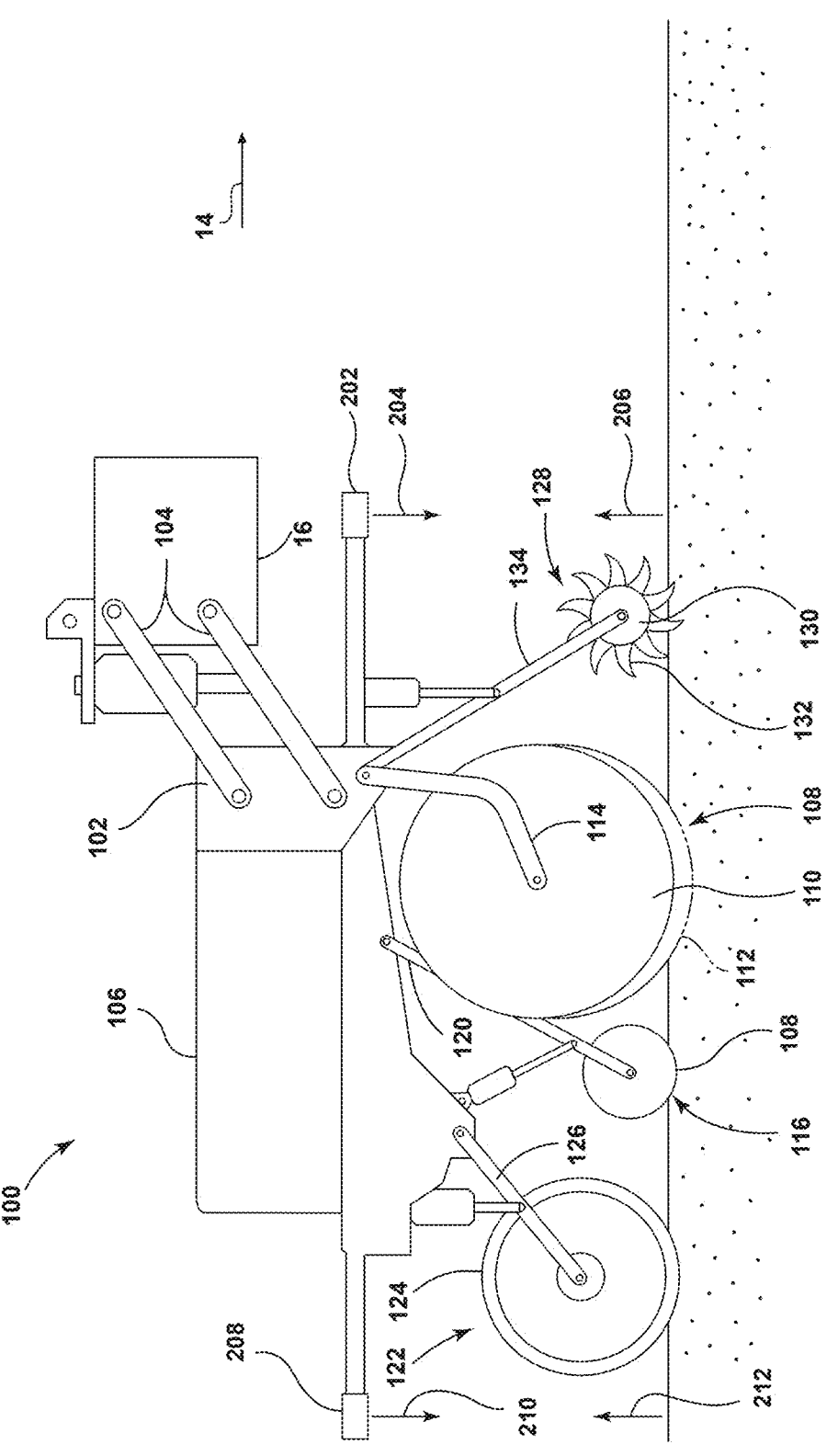
FIG. 2 illustrates a side view of one embodiment of a row unit of a seed-planting implement in accordance with aspects of the present subject matter.

FIG. 2 illustrates a side view of one embodiment of a row unit 100 of the seed-planting implement 10. As shown, the row unit 100 includes a row unit frame 102 adjustably coupled to the toolbar 16 by links 104. For example, one end of each link 104 may be pivotably coupled to the row unit frame 102, while the opposed end of each link 104 may be pivotably coupled to the toolbar 16. However, in alternative embodiments, the row unit 100 may be coupled to the toolbar 16 in any other suitable manner. Furthermore, a hopper 106 may be coupled to or otherwise supported on the row unit frame 102 and configured to store seeds (e.g., that are received from a bulk storage tank or filled individually).

Moreover, the row unit 100 also includes a furrow opening assembly 108. For example, in one embodiment, the furrow opening assembly 108 may include a gauge wheel 110 and a furrow-forming tool, such as one or more disk openers 112, which is configured to excavate a furrow or trench in the soil. In general, the gauge wheel 110 is configured to engage the top surface of the soil as the implement 10 is moved across the field. As such, the height of the disk opener(s) 112 may be adjusted with respect to the position of the gauge wheel 110 to set the depth of the furrow being excavated. Furthermore, the furrow opening assembly 108 may include a support arm 114 configured to adjustably couple the gauge wheel 110 to the row unit frame 102. For example, one end of the support arm 114 may be rotatably coupled to the gauge wheel 110, while an opposed end of the support arm 114 may be pivotably coupled to the row unit frame 102. Additionally, the disk opener(s) 112 may be rotatably coupled (e.g., bolted) to the row unit frame 102. However, in alternative embodiments, the gauge wheel 110 and the disk opener(s) 112 may be coupled to the row unit frame 102 in any other suitable manner. In addition, in other embodiments, the furrow opening assembly 108 may include any other suitable type of furrow-forming tools, such as a hoe(s).

Furthermore, the row unit 100 may include a furrow closing assembly 116. Specifically, in several embodiments, the furrow closing assembly 116 may include a pair of closing disks 118 (only one of which is shown) positioned relative to each other to permit the soil to flow between the disks 118 as the implement 10 travels across the field. In this regard, the closing disks 118 are configured to close the furrow after seeds have been deposited therein, such as by collapsing the excavated soil into the furrow. Moreover, the furrow closing assembly 116 may include a support arm 120 configured to adjustably couple the closing disks 118 to the row unit frame 102. For example, one end of the support arm 120 may be rotatably coupled to the closing disks 118, while the opposed end of the support arm 120 may be pivotably coupled to the row unit frame 102. However, in alternative embodiments, the closing disks 118 may be coupled to the row unit frame 102 in any other suitable manner. Moreover, in alternative embodiments, the furrow closing assembly 116 may include any other suitable components for closing the furrow, such as a pair of closing wheels (not shown). Furthermore, in some embodiments, the row unit 100 may not include the furrow closing assembly 116.

Additionally, the row unit 100 may include a press wheel assembly 122. Specifically, in several embodiments, the press wheel assembly 122 may include a press wheel 124 configured to roll over the closed furrow to firm the soil over the seed and promote favorable seed-to-soil contact. In embodiments in which the row unit 100 does not include the furrow closing assembly 116, the press wheel assembly 122 may close the furrow after seeds have been deposited therein. Furthermore, the press wheel assembly 122 may include a support arm 126 configured to adjustably couple the press wheel 124 to the row unit frame 102. For example, one end of the support arm 126 may be rotatably coupled to the press wheel 124, while the opposed end of the support arm 126 may be pivotably coupled to the row unit frame 102. However, in alternative embodiments, the press wheel 124 may be coupled to the row unit frame 102 in any other suitable manner. Moreover, in some embodiments, the row unit 100 may not include the press wheel assembly 122.

Furthermore, the row unit 100 includes a row cleaner assembly 128 positioned forward of the disk opener(s) 112 relative to the direction of travel 14. In this regard, the row cleaner assembly 128 may be configured to break up and/or sweep away residue, dirt clods, trash, and/or other debris from the path of the row unit 100 before the furrow is formed in the soil. For example, in one embodiment, the row cleaner assembly 128 may include one or more row cleaner wheels 130, with each wheel 130 having a plurality of tillage points or fingers 132. As such, the row cleaner wheel(s) 130 may be positioned relative to the soil surface such that the wheel(s) 130 roll relative to the field as the implement 10 travels across the field, thereby allowing the fingers 132 to break up and/or sweep away residue, dirt clods, trash, and/or other debris. Additionally, the row cleaner assembly 128 may include a row cleaner arm 134 configured to adjustably couple the row cleaner wheel(s) 130 to the row unit frame 102. For example, one end of the row cleaner arm 134 may be rotatably coupled to the row cleaner wheel(s) 130, while an opposed end of the row cleaner arm 134 may be pivotably coupled to the row unit frame 102.

The configuration of the seed-planting implement 10 described above and shown in FIGS. 1 and 2 is provided only to place the present subject matter in an exemplary field of use. Thus, the present subject matter may be readily adaptable to any manner of seed-planting implement configuration.

As shown in FIG. 2, the row unit 100 includes a first radar sensor 202 supported on the row unit frame 102. More specifically, the first radar sensor 202 is configured to emit output signals (e.g., as indicated by arrow 204), such as radio wave or microwave signals, directed at a sub-surface detection zone of the field across which the implement 10 is traveling. The output signals 204 are reflected by the soil within the sub-surface detection zone as return signals (e.g., as indicated by arrow 206). Furthermore, the first radar sensor 202 is configured to receive reflections of the output signals 204 as the return signals 206. Thus, the first radar sensor 202 may generate first radar sensor data including a plurality of first radar data points. Each first radar data point, in turn, corresponds to one or more parameters associated with the reflection of a given output signals 204 off of the soil at a given location within the sub-surface detection zone, such as the magnitude, phase, and/or time domain of the associated return signal 206. As will be described below, the first radar sensor data is used to determine the location of the seeds within the field.

Furthermore, the row unit 100 includes a second radar sensor 208 supported on the row unit frame 102. More specifically, the second radar sensor 208 is configured to emit output signals (e.g., as indicated by arrow 210), such as radio wave or microwave signals, directed at the sub-surface detection zone of the field across which the implement 10 is traveling. The output signals 210 are reflected by the soil and the seed within the second sub-surface detection zone 211 as return signals (e.g., as indicated by arrow 212). Furthermore, the second radar sensor 208 is configured to receive reflections of the output signals 210 as the return signals 212. Thus, the second radar sensor 208 may generate second radar sensor data including a plurality of second radar data points. Each second radar data point, in turn, corresponds to one or more parameters associated with the reflection of a given output signals 210 off of the soil at a given location within the sub-surface detection zone, such as the magnitude, phase, and/or time domain of the associated return signal 212. As will be described below, the second radar sensor data is used to determine the location of the seeds within the field.

Figure 3:
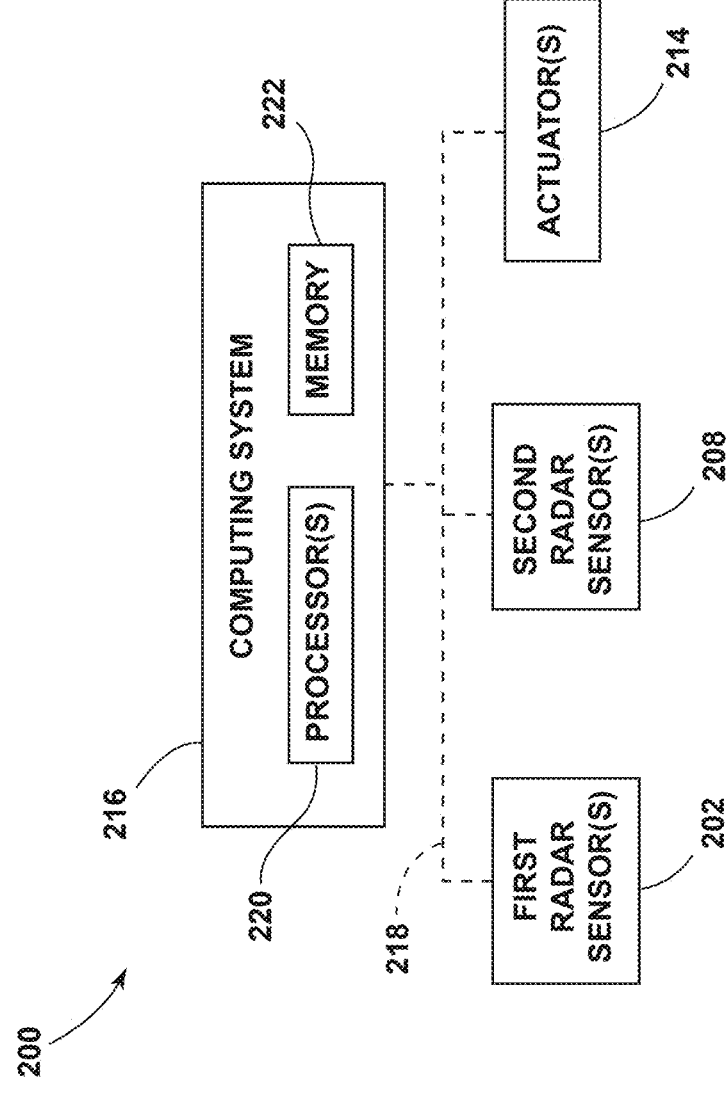
FIG. 3 illustrates a schematic view of one embodiment of a system for determining seed placement during a seed-planting operation in accordance with aspects of the present subject matter.

Referring now to FIG. 3, a schematic view of one embodiment of a system 200 for determining seed placement during a seed-planting operation is illustrated in accordance with aspects of the present subject matter. In general, the system 200 will be described herein with reference to the seed-planting implement 10 described above with reference to FIGS. 1 and 2. However, it should be appreciated by those of ordinary skill in the art that the disclosed system 200 may generally be utilized with seed-planting implements having any other suitable implement configuration.

As shown in FIG. 3, the system 200 may include one or more actuator(s) 214 of the seed-planting implement 10. In general, the actuator(s) 214 is configured to adjust the operation of the seed-planting implement 10, such as by adjusting the depth of the furrows being formed by the disk opener(s) 112 of the row unit(s) 100 and/or the rate at which seeds are dispensed from the implement 10. For example, in one embodiment, the actuator(s) 214 may correspond to a hydraulic cylinder(s), an electric motor(s), an electric linear actuator(s), or the like that automatically adjust the position of the gauge wheel(s) 110 relative to the row unit frame(s) 102. As such, by controlling the operation of the actuator(s) 214, the depth of the furrow(s) being formed and, thus, the positioning of the seeds within the field can be adjusted. In another embodiment, the actuator(s) 218 may correspond to the seed meter(s) of the implement 10. In this regard, by controlling the operation of the actuator(s) 218, the rate at which seeds are dispensed from the implement 10 can be adjusted.

Moreover, the system 200 includes a computing system 216 communicatively coupled to one or more components of the seed-planting implement 10 and/or the system 200 to allow the operation of such components to be electronically or automatically controlled by the computing system 216. For instance, the computing system 216 may be communicatively coupled to the first and second radar sensors 202, 208 via a communicative link 218. As such, the computing system 216 may be configured to receive first and second radar sensor data from the first and second radar sensors 202, 208 that is indicative of one or more parameter of the output signals reflected by the first and second sub-surface detection zones, respectively. Furthermore, the computing system 216 may be communicatively coupled to the actuator(s) 214 via the communicative link 218. In this respect, the computing system 216 may be configured to control the operation of the actuator(s) 214 to adjust the depth(s) of the furrow(s) being formed and/or the rate at which seeds are dispensed from the implement 10. In addition, the computing system 216 may be communicatively coupled to any other suitable components of the implement 10 and/or the system 200.

In general, the computing system 216 may comprise one or more processor-based devices, such as a given controller or computing device or any suitable combination of controllers or computing devices. Thus, in several embodiments, the computing system 216 may include one or more processor(s) 220 and associated memory device(s) 222 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 222 of the computing system 216 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 222 may generally be configured to store suitable computer-readable instructions that, when implemented by the processor(s) 220, configure the computing system 216 to perform various computer-implemented functions, such as one or more aspects of the methods and algorithms that will be described herein. In addition, the computing system 216 may also include various other suitable components, such as a communications circuit or module, one or more input/output channels, a data/control bus and/or the like.

The various functions of the computing system 216 may be performed by a single processor-based device or may be distributed across any number of processor-based devices, in which instance such devices may be considered to form part of the computing system 216. For instance, the functions of the computing system 216 may be distributed across multiple application-specific controllers or computing devices, such as a navigation controller, an engine controller, a transmission controller, an implement controller, and/or the like.

Figure 4:
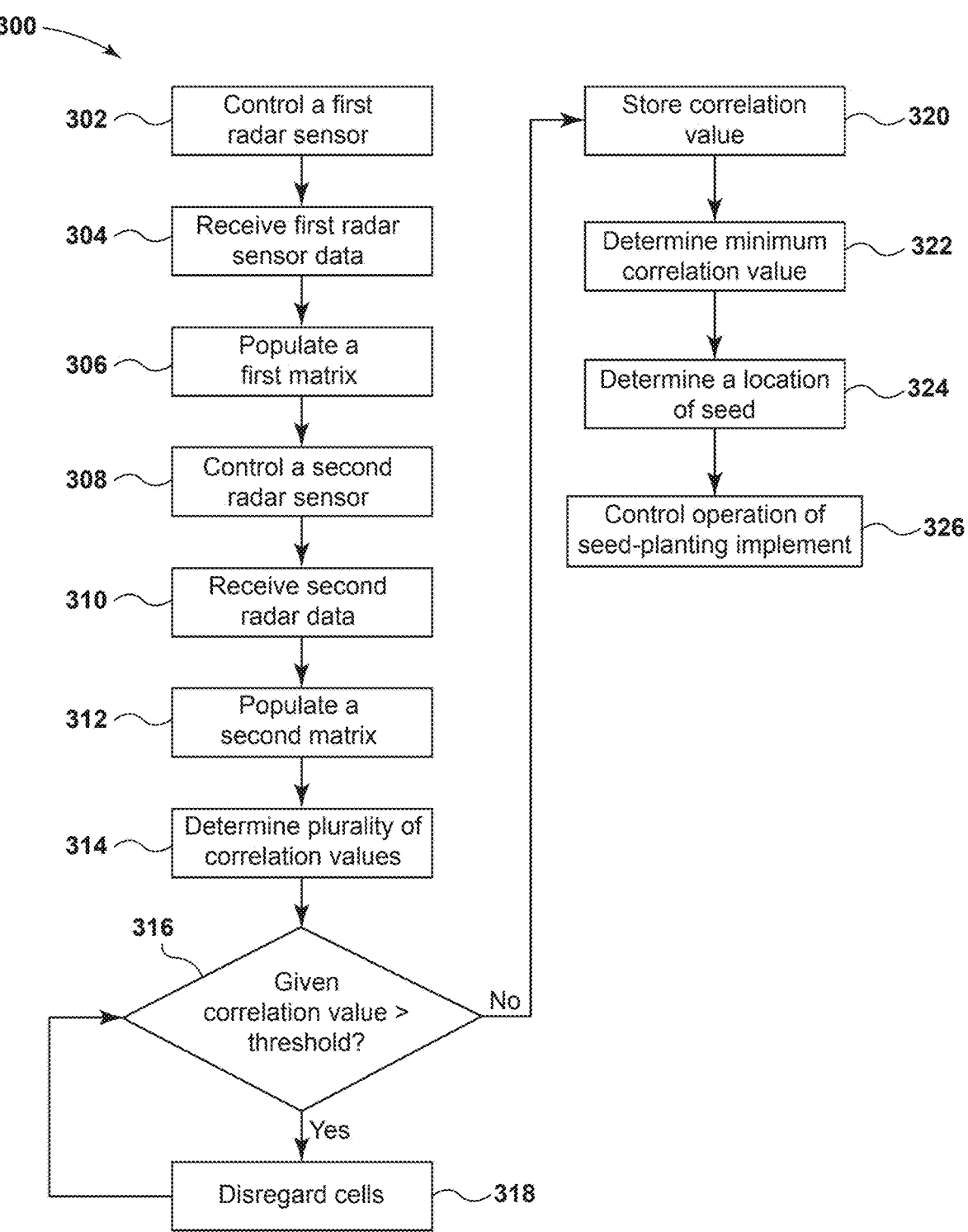
FIG. 4 illustrates a flow diagram providing one embodiment of control logic for determining seed placement during a seed-planting operation in accordance with aspects of the present subject matter.

Referring now to FIG. 4, a flow diagram of one embodiment of example control logic 300 that may be executed by the computing system 216 (or any other suitable computing system) for determining seed placement during a seed-planting operation is illustrated in accordance with aspects of the present subject matter. Specifically, the control logic 300 shown in FIG. 4 is representative of steps of one embodiment of an algorithm that can be executed to determine seed placement during a seed-planting operation in a manner that reduces the computing resources and/or processing time to make such determinations. However, in other embodiments, the control logic 300 may be used in association with any other suitable system, application, and/or the like for determining seed placement during a seed-planting operation.

For clarity, the control logic 300 is described in the context of a single row unit 100 having a single first radar sensor 202 and a single second radar sensor 208. However, the control logic 300 may be performed simultaneously on any number of row units 100 of the seed-planting implement 10. For example, in one embodiment, each row unit 100 of the implement 10 may include one first radar sensor 202 and one second radar sensor 208. In such an embodiment, the computing system 216 may implement the control logic 300 with respect to each row unit 100 such that the location of each seed dispensed into the ground by each row unit 100 is determined.

As shown in FIG. 4, at (302), the control logic 300 includes controlling a first radar sensor supported on a seed-planting implement such that the first radar sensor scans a sub-surface detection zone of a field across which the implement is traveling before a seed is deposited within the sub-surface detection zone. Specifically, as mentioned above, in several embodiments, the computing system 216 may be communicatively coupled to the first radar sensor 202 via the communicative link 218. In this respect, as the seed-planting implement 10 travels across the field to perform a seed-planting operation thereon, the computing system 216 may control the first radar sensor(s) 202 such that the first radar sensor(s) 202 scans a sub-surface detection zone of a field before a seed is deposited within the sub-surface detection zone. As such, the computing system 216 may transmit control signals to the first radar sensor 202 via the communicative link 218. Such control signals, in turn, instruct the first radar sensor 202 to scan at least a portion of the sub-surface detection zone.

In general, the sub-surface detection zone is a portion of the soil of the field positioned below the surface of the field into which a seed will be deposited. In several embodiments, the sub-surface detection zone may be a two-dimensional plane extending in a longitudinal direction that is parallel to a direction of travel 14 of the seed-planting implement 10 and a vertical direction that is perpendicular to the longitudinal direction. In such embodiment, the computing system 216 may be configured to control the first radar sensor 202 such that the first radar sensor 202 performs a one-dimensional scan of a portion of the sub-surface detection zone extending in the vertical direction before the seed is deposited within the soil of the field. However, in alternative embodiment, the computing system 216 may control the first radar sensor 202 such that the first radar sensor 202 scans at least a portion of the sub-surface detection zone in any other suitable manner.

Referring again to FIG. 4, at (304), the control logic 300 includes receiving first radar sensor data including a plurality of first radar data points from the first radar sensor, with each first radar data point corresponding to a parameter associated with the reflection of an output signal emitted by the first radar sensor from a given location within the sub-surface detection zone. Specifically, in several embodiments, the computing system 216 is configured to receive first radar sensor data including a plurality of first radar data points from the first radar sensor 202 via the communicative link 218. Each first radar data point may, in turn, correspond to one or more parameters (e.g., the magnitude, phase, and/or time domain) associated with the reflection of an output signal emitted by the first radar sensor 202 from a given location within the sub-surface detection zone. As will be described below, the received first radar sensor data is subsequently used to determine the placement of the seeds within the field.

Furthermore, at (306), the control logic 300 includes populating a first matrix including a plurality of cells with the plurality of first data points such that each first data point is placed within a cell corresponding to the given location within the sub-surface detection zone. Specifically, in several embodiments, the computing system 216 is configured to populate a first matrix including a plurality of cells with the plurality of first data points received at (304) such that each first data point is placed within a cell corresponding to the given location within the sub-surface detection zone. The first matrix, in turn, includes a plurality of cells arranged into N rows and J columns, where N and J are integer values that may be the same or different. Each cell corresponds to a different location within the first sub-soil detection zone. Furthermore, each cell includes one or more parameter value(s) (e.g., the magnitude, phase, and/or time domain values) associated with the reflection received from the corresponding location within the sub-surface detection zone by the first radar sensor 202. For example, in some embodiments, the computing system 216 may be configured to populate a column of the plurality of cells of the first matrix with the plurality of first data points received from the one-dimensional scan of the portion of the sub-surface detection zone by the first radar sensor 202. However, in alternative embodiments, the computing system 216 may populate the first matrix with the plurality of first data points in any other suitable manner.

Moreover, after controlling the first radar sensor, at (308), the control logic 300 includes controlling a second radar sensor supported on the seed-planting implement such that the second radar sensor scans the sub-surface detection zone after a seed is deposited within the sub-surface detection zone. Specifically, as mentioned above, in several embodiments, the computing system 216 may be communicatively coupled to the second radar sensor 208 via the communicative link 218. In this respect, as the seed-planting implement 10 travels across the field to perform a seed-planting operation thereon and after controlling the first radar sensor 202, the computing system 216 may control the second radar sensor(s) 208 such that the second radar sensor(s) 208 scans the sub-surface detection zone after a seed is deposited within the sub-surface detection zone. As such, the computing system 216 may transmit control signals to the second radar sensor 208 via the communicative link 218. Such control signals, in turn, instruct the second radar sensor 208 to scan at least a portion of the sub-surface detection zone.

The sub-surface detection zone scanned by the second radar sensor 208 is the same portion of the field scanned by the first radar sensor 202. In this respect, at (308), the computing system 216 may control the operation of the second radar sensor 208 based on one or more parameters, such as the ground speed of the seed-planting implement 10, such that the second radar sensor 208 emits the output signals at a time at which such output signals will be reflected by the same portion of the field that reflected the output signals emitted by the first radar sensor 202 at (302).

As mentioned above, in several embodiments, the sub-surface detection zone may be a two-dimensional plane extending in the longitudinal and vertical directions. In such embodiments, the computing system 216 may be configured to control the second radar sensor 208 such that the second radar sensor 208 performs a one-dimensional scan of a portion of the sub-surface detection zone extending in the vertical direction after the seed is deposited within the soil of the field. However, in alternative embodiments, the computing system 216 may control the second radar sensor 208 such that the second radar sensor 208 scans at least a portion of the sub-surface detection zone in any other suitable manner.

Referring again to FIG. 4, at (310), the control logic 300 includes receiving second radar sensor data including a plurality of second radar data points from the second radar sensor, with each second radar data point corresponding to a parameter associated with the reflection of an output signal emitted by the second radar sensor from a given location within the sub-surface detection zone. Specifically, in several embodiments, the computing system 216 is configured to receive second radar sensor data including a plurality of first radar data points from the second radar sensor 208 via the communicative link 218. Each second radar data point may, in turn, correspond to one or more parameters (e.g., the magnitude, phase, and/or time domain) associated with the reflection of an output signal emitted by the second radar sensor 208 from a given location within the sub-surface detection zone. As will be described below, the received second radar sensor data is subsequently used to determine the placement of the seeds within the field.

Furthermore, at (312), the control logic 300 includes populating a second matrix including a plurality of cells with the plurality of second data points such that each second data point is placed within a cell corresponding to the given location within the sub-surface detection zone. Specifically, in several embodiments, the computing system 216 is configured to populate a second matrix including a plurality of cells with the plurality of second data points such that each second data point is placed within a cell corresponding to the given location within the sub-surface detection zone. Like the first matrix, the second matrix includes a plurality of cells arranged into N rows and J columns, where N and J are integer values that may be the same or different. Each cell corresponds to a different location within the first sub-soil detection zone. That is, the second matrix has the same number and arrangement of cells as the first matrix. Moreover, each cell includes one or more parameter value(s) (e.g., the magnitude, phase, and/or time domain values) associated with the reflection received from the corresponding location within the sub-surface detection zone by the second radar sensor 208. For example, in some embodiments, the computing system 216 may be configured to populate a column of the plurality of cells of the second matrix with the plurality of second data points received from the one-dimensional scan of the portion of the sub-surface detection zone by the second radar sensor 208. However, in alternative embodiments, the computing system 216 may populate the second matrix with the plurality of second data points in any other suitable manner.

Figure 5:
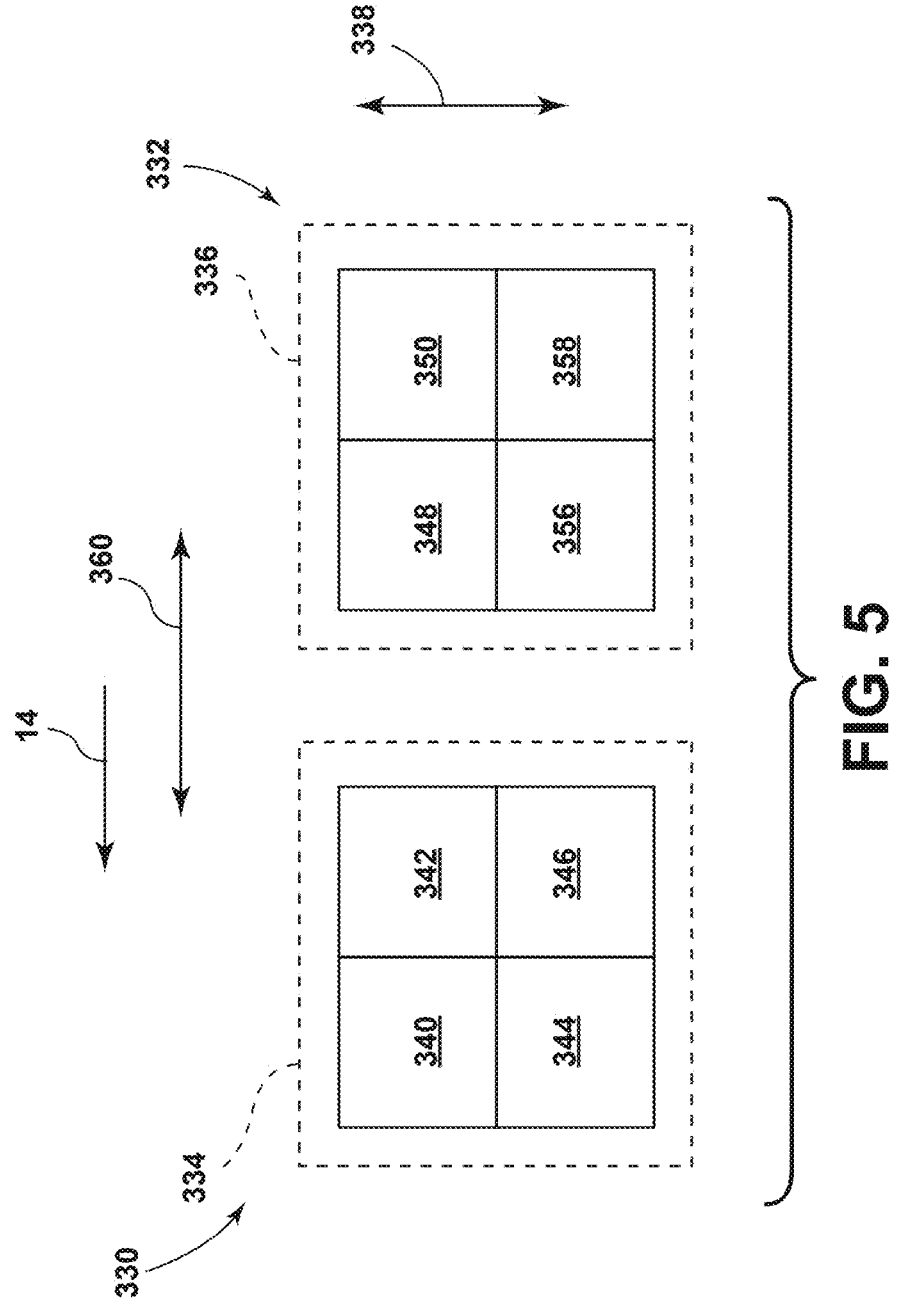
FIG. 5 illustrates an example view of a first matrix and a second matrix superimposed over a sub-surface detection zone of a field in accordance with aspects of the present subject matter.

Each cell in the first matrix corresponds to a cell in the second matrix. In this respect, the parameter values(s) of a given cell in the first matrix is taken from the same location within the field (but before the seed is deposited into the furrow) as the parameter value(s) in a corresponding cell in the second matrix (but after the seed is deposited into the furrow). FIG. 5 illustrates an example view of a first matrix 340 and a second matrix 342 superimposed over the sub-surface detection zone 226. As shown, the sub-surface detection zone 226 is a two-dimensional plane oriented in the longitudinal direction 230 and the vertical direction 232. Furthermore, as shown, the first matrix 340 includes cells 344, 346, 348, and 350. Each cell, in turn, corresponds to and includes a parameter value(s) associated with the portion of the sub-surface detection zone 226 over which it is superimposed. Additionally, the second matrix 342 includes cells 352, 354, 356, and 358. Each cell, in turn, corresponds to and includes a parameter value(s) associated with the portion of the sub-surface detection zone 226 over which it is superimposed. Moreover, the cells 344, 346, 348, and 350 in the first matrix 340 respectively correspond to the cells 352, 354, 356, and 358 in the second matrix 342. Thus, the cell 344 includes the parameter value(s) taken from the same location within the field (but before the seed is dispensed into the furrow) as the cell 352 (but after the seed is dispensed into the furrow), and so on. In FIG. 5, each matrix is shown as having only four cells for simplicity. However, each matrix may have any suitable number of cells, such as fifty cells, one hundred cells, two hundred cells, or more.

As will be described below, the computing system 216 is configured to determine the correlation between on the first matrix populated at (306) and the second matrix populated at (312). For example, the computing system 216 may be configured to compare the first matrix to the second matrix to determine the location of the seed to determine such correlation. Thereafter, the computing system 216 may determine the location of the seed based on the determined correlation between the first and second matrices.

Referring again to FIG. 4, at (314), the control logic 300 includes determining a plurality of correlation values. Specifically, in several embodiments, the computing system 216 may be configured to determine a plurality of correlation values. Each correlation value, in turn, is indicative of the correlation between the parameter value(s) of a given cell of the first matrix generated at (306) and the parameter value(s) of a cell at a corresponding location within the second matrix generated (312). As will be described below, the determined correlation values are used to remove clutter from first and second radar data and determine the location of the seed.

The determined correlation values may be any suitable values indicating the correlation or similarity between the parameter value(s) of a given cell of the first matrix and the parameter value(s) of a cell at a corresponding location within the second matrix. For example, in one embodiment, the correlation values may be a simple difference between the parameter value(s). However, in other embodiments, the correlation values may be a more complex indication of correlation.

Furthermore, at (316), the control logic 300 includes comparing a given correlation value to a threshold value. Specifically, in several embodiments, the computing system 216 may be configured to compare each correlation value for the first and second matrices determined at (314) to a threshold value. When a given correlation value exceeds the threshold value (thereby indicating that the parameter value(s) of the corresponding cells are highly similar), the computing system 216 disregard the corresponding cells as clutter at (318). Conversely, when the given correlation value is equal to or falls below the threshold value (thereby indicating that the parameter value(s) of the corresponding cells are not highly similar), the computing system 216 store the correlation value at (320) for further analysis. (316) may be repeated for all correlation values determined at (314).

Additionally, at (322), the control logic 300 includes determining a minimum correlation value of the plurality of correlation values. Specifically, in several embodiments, the computing system 216 may be configured to analyze the correlation values stored at (320) (i.e., the correlation values for the cells not disregarded as clutter) to determine the minimum correlation value of the plurality of correlation values.

Moreover, at (324), the control logic 300 includes determining the location of the seed based on the location of the cells having the minimum correlation value within the first matrix and the second matrix. More specifically, the soil and the seeds reflect the output signals of the first and second radar sensors 202, 208 differently. Thus, a return signal reflected off of a seed will have much different parameters compared to the return signal reflected off of soil. As such, the cells in the first and second matrices having the minimum correlation values have most disparate parameter value(s) and, thus, are likely where the seed is located. Accordingly, the computing system 216 may be configured to determine the location of the seed based on the location of the cells having the minimum correlation value with in the first matrix and the second matrix. For example, the computing system 216 may determine that the seed is located at the location within the soil corresponding to the location of the cells having the minimum correlation value.

At (324), the computing system 216 may be configured to determine any suitable location parameter for the seed. For example, in one embodiment, the computing system 216 may determine the depth of the seed.

In addition, at (326), the control logic 300 includes controlling, with the computing system, the operation of the seed-planting implement based on the determined location of the seed. Specifically, in several embodiments, the computing system 216 is configured to control the operation of the seed-planting implement 10 based on the location of the seed determined at (324). For example, in one embodiment, the computing system 216 may compare the depth of the seed determined at (324) to a depth range. Thereafter, when the depth of the seed falls outside of the range (thereby indicating that the seed is too shallow or too deep), the computing system 216 may control the operation of the actuator(s) 214 to adjust the depth of the furrow being formed within the field. (326) is optional and may be omitted in some embodiments.

Additionally, or in lieu of (326), the computing system 216 may log the locations of the seeds determined at (324), such as by storing such determinations within its memory device(s) 222 or within the memory device(s) of another computing system (not shown). Moreover, in some embodiments, the computing system 216 may initiate display of the determined locations of the seeds on a display device or other user interface (not shown), such as display device within the work vehicle (not shown) towing the implement 10 or via a remote computing device (not shown) (e.g., a Smartphone, tablet, laptop, etc.).

Figure 6:
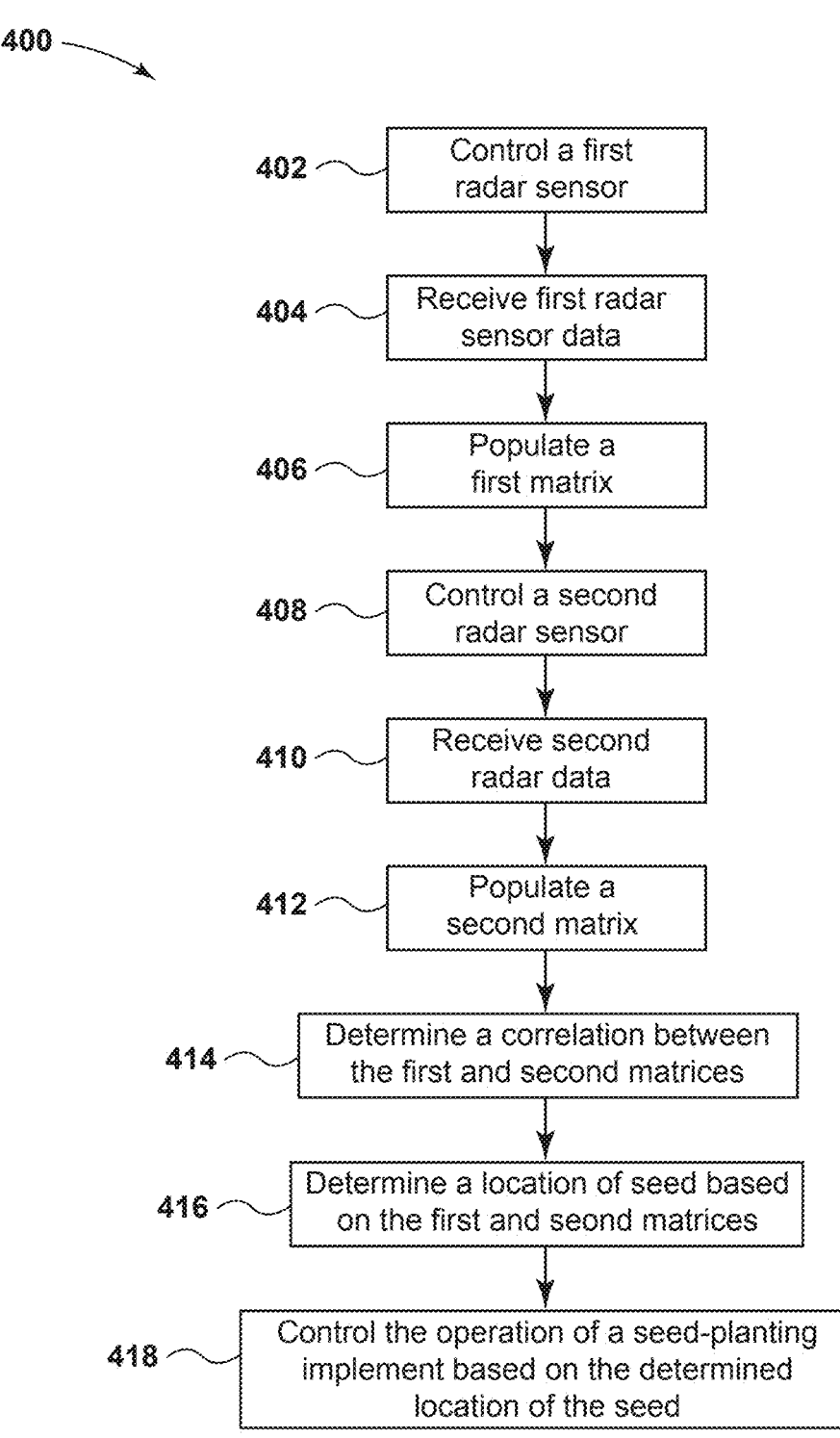
FIG. 6 illustrates a flow diagram of one embodiment of a method for determining seed placement during a seed-planting operation in accordance with aspects of the present subject matter.

Referring now to FIG. 6, a flow diagram of one embodiment of a method 400 for determining seed placement during a seed-planting operation is illustrated in accordance with aspects of the present subject matter. In general, the method 400 will be described herein with reference to the seed-planting implement 10 and the system 200 described above with reference to FIGS. 1-7. However, it should be appreciated by those of ordinary skill in the art that the disclosed method 400 may generally be implemented with any seed-planting implement having any suitable seed-planting implement configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 includes controlling, with a computing system, a first radar sensor such that the first radar sensor scans a sub-surface detection zone of a field before a seed is deposited within the sub-surface detection zone. For instance, as described above, the computing system 216 may control the first radar sensor(s) 202 such that the first radar sensor(s) 202 scans a sub-surface detection zone of a field before a seed is deposited within the sub-surface detection zone.

Furthermore, at (404), the method 400 includes receiving, with the computing system, first radar sensor data including a plurality of first radar data points from the first radar sensor, with each first radar data point corresponding to a parameter associated with a reflection of an output signal emitted by the first radar sensor from a given location within the sub-surface detection zone. For instance, as described above, the computing system 216 may receive first radar sensor data including a plurality of first radar data points from the first radar sensor(s) 202. Each first radar data point, in turn, corresponds to a parameter associated with the reflection of an output signal emitted by the corresponding first radar sensor 202 from a given location within the sub-surface detection zone.

Additionally, at (406), the method 400 includes populating, with the computing system, a first matrix including a plurality of cells with the plurality of first data points such that each first data point is placed within a cell corresponding to the given location within the sub-surface detection zone. For instance, as described above, the computing system 216 may populate a first matrix including a plurality of cells with the plurality of first data points such that each first data point is placed within a cell corresponding to the given location within the sub-surface detection zone.

Moreover, after controlling the first radar sensor, at (408), the method 400 includes controlling, with the computing system, a second radar sensor such that the second radar sensor scans the sub-surface detection zone of the field after the seed is deposited within the sub-surface detection zone. For instance, as described above, after controlling the first radar sensor(s) 202, the computing system 216 may control the second radar sensor(s) 208 such that the second radar sensor(s) 208 scans the sub-surface detection zone of the field after the seed is deposited within the sub-surface detection zone.

In addition, at (410), the method 400 includes receiving, with the computing system, second radar sensor data including a plurality of second radar data points from the second radar sensor, with each second radar data point corresponding to a parameter associated with a reflection of an output signal emitted by the second radar sensor from a given location within the sub-surface detection zone. For instance, as described above, the computing system 216 may receive second radar sensor data including a plurality of second radar data points from the second radar sensor(s) 208. Each second radar data point, in turn, corresponds to a parameter associated with the reflection of an output signal emitted by the corresponding second radar sensor 208 from a given location within the sub-surface detection zone.

Furthermore, at (412), the method 400 includes populating, with the computing system, a second matrix including a plurality of cells with the plurality of second data points such that each second data point is placed within a cell corresponding to the given location within the sub-surface detection zone. For instance, as described above, the computing system 216 may populate a second matrix including a plurality of cells with the plurality of second data points such that each second data point is placed within a cell corresponding to the given location within the sub-surface detection zone.

Additionally, at (414), the method 400 includes determining a correlation between the first and second matrices. For instance, as described above, the computing system 216 may determine a correlation between the first and second matrices.

Moreover, at (416), the method 400 includes determining, with the computing system, a location of the seed based on the first and second matrices. For instance, as described above, the computing system 216 may determining, with the computing system, the location of the seed based on the first and second matrices.

Moreover, at (418), the method 400 includes controlling, with the computing system, an operation of the seed-planting implement based on the determined location of the seed. For instance, as described above, the computing system 216 may control the operation of the seed-planting implement 10 based on the determined location of the seed, such as by controlling the operation of the actuator(s) 214 to adjust the position(s) of the gauge wheel(s) 110 relative to the row unit frame(s) 102 to adjust the depth(s) of the furrow(s) being formed within the field and/or the rate at which seeds are dispensed from the implement 10.

It is to be understood that the steps of the control logic 300 and the method 400 are performed by the computing system 216 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 216 described herein, such as the control logic 300 and the method 400, is implemented in software code or instructions which are tangibly stored on a tangible computer readable medium. The computing system 216 loads the software code or instructions via a direct interface with the computer readable medium or via a wired and/or wireless network. Upon loading and executing such software code or instructions by the computing system 216, the computing system 216 may perform any of the functionality of the computing system 216 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A seed-planting implement, comprising:
   a frame;
   a disk opener rotatably coupled to the frame;
   a gauge wheel adjustably coupled to the frame;
   first and second radar sensors supported on the frame; and
   a computing system communicatively coupled to the first and second radar sensors, the computing system configured to:
   control the first radar sensor such that the first radar sensor scans a sub-surface detection zone of a field before a seed is deposited within the sub-surface detection zone;

receive first radar sensor data including a plurality of first radar data points from the first radar sensor, each first radar data point corresponding to a parameter associated with a reflection of an output signal emitted by the first radar sensor from a given location within the sub-surface detection zone;

populate a first matrix including a plurality of cells with the plurality of first data points such that each first data point is placed within a cell corresponding to the given location within the sub-surface detection zone;

after controlling the first radar sensor, control the second radar sensor such that the second radar sensor scans the sub-surface detection zone of the field after the seed is deposited within the sub-surface detection zone;

receive second radar sensor data including a plurality of second radar data points from the second radar sensor, each second radar data point corresponding to a parameter associated with a reflection of an output signal emitted by the second radar sensor from a given location within the sub-surface detection zone;

populate a second matrix including a plurality of cells with the plurality of second data points such that each second data point is placed within a cell corresponding to the given location within the sub-surface detection zone;

determine a correlation between the first and second matrices; and determine a location of the seed based on the determined correlation between the first and second matrices.

2. The seed-planting implement of claim 1, wherein, when determining the correlation, the computing system is configured to:

compare the generated first matrix to the generated second matrix to determine the correlation.

3. The seed-planting implement of claim 1, wherein, when determining the correlation, the computing system is further configured to:

determine a plurality of correlation values, each correlation value being indicative of a correlation between the parameter of a given cell of the first matrix and a parameter of a cell of at a corresponding location within the second matrix.

4. The seed-planting implement of claim 3, wherein, when determining the location of the seed, the computing system is further configured to:

determine a minimum correlation value of the plurality of correlation values; and determine the location of the seed based on a location of the cells having the minimum correlation value within the first matrix and the second matrix.

5. The seed-planting implement of claim 1, wherein the computing system is configured to control an operation of the seed-planting implement based on the determined location of the seed.

6. A system for determining seed placement during a seed-planting operation, the system comprising:

first and second radar sensors supported on a frame; and a computing system communicatively coupled to the first and second radar sensors, the computing system configured to:

control the first radar sensor such that the first radar sensor scans a sub-surface detection zone of a field before a seed is deposited within the sub-surface detection zone; receive first radar sensor data including a plurality of first radar data points from the first radar sensor, each first radar data point corresponding to a parameter associated with a reflection of an output signal emitted by the first radar sensor from a given location within the sub-surface detection zone;

populate a first matrix including a plurality of cells with the plurality of first data points such that each first data point is placed within a cell corresponding to the given location within the sub-surface detection zone;

after controlling the first radar sensor, control the second radar sensor such that the second radar sensor scans the sub-surface detection zone of the field after the seed is deposited within the sub-surface detection zone;

receive second radar sensor data including a plurality of second radar data points from the second radar sensor, each second radar data point corresponding to a parameter associated with a reflection of an output signal emitted by the second radar sensor from a given location within the sub-surface detection zone;

populate a second matrix including a plurality of cells with the plurality of second data points such that each second data point is placed within a cell corresponding to the given location within the sub-surface detection zone;

determine a correlation between the first and second matrices; and determine a location of the seed based on the determined correlation between the first and second matrices.

7. The system of claim 6, wherein, when determining the correlation, the computing system is configured to:

compare the generated first matrix to the generated second matrix to determine the location of the seed.

8. The system of claim 6, wherein, when determining the correlation, the computing system is further configured to:

determine a plurality of correlation values, each correlation value being indicative of a correlation between the parameter of a given cell in the first matrix and a parameter of a cell at a corresponding location within the second matrix.

9. The system of claim 8, wherein, when determining the location of the seed, the computing system is further configured to:

determine a minimum correlation value of the plurality of correlation values; and determine the location of the seed based on a location of the cells having the minimum correlation value within the first matrix and the second matrix.

10. The system of claim 8, wherein, when determining the location of the seed, the computing system is further configured to:

compare a given correlation value to a threshold value; and disregard as clutter the parameter value of a cell within the first matrix and the parameter value of a cell within the second matrix corresponding to the given correlation value when the given correlation value exceeds the threshold value.

11. The system of claim 6, wherein the location of the seed comprises a depth of the seed below a surface of the field.

12. The system of claim 6, wherein the parameter associated with the reflection of the output signal emitted by the first radar sensor and the parameter value associated with the reflection of the output signal emitted by the second radar sensor are indicative of a phase of the reflections.

13. The system of claim 6, wherein the parameter associated with the reflection of the output signal emitted by the first radar sensor and the parameter value associated with the reflection of the output signal emitted by the second radar sensor are indicative of a magnitude of the reflections.

14. The system of claim 6, wherein the parameter associated with the reflection of the output signal emitted by the first radar sensor and the parameter value associated with the reflection of the output signal emitted by the second radar sensor are indicative of a time domain of the reflections.

15. The system of claim 6, wherein the computing system is configured to control an operation of the seed-planting implement based on the determined location of the seed.

16. A method for determining seed placement during a seed-planting operation, the method comprising:

controlling, with a computing system, a first radar sensor such that the first radar sensor scans a sub-surface detection zone of a field before a seed is deposited within the sub-surface detection zone;

receiving, with the computing system, first radar sensor data including a plurality of first radar data points from the first radar sensor, each first radar data point corresponding to a parameter associated with a reflection of an output signal emitted by the first radar sensor from a given location within the sub-surface detection zone;

populating, with the computing system, a first matrix including a plurality of cells with the plurality of first data points such that each first data point is placed within a cell corresponding to the given location within the sub-surface detection zone;

after controlling the first radar sensor, controlling, with the computing system, a second radar sensor such that the second radar sensor scans the sub-surface detection zone of the field after the seed is deposited within the sub-surface detection zone;

receiving, with the computing system, second radar sensor data including a plurality of second radar data points from the second radar sensor, each second radar data point corresponding to a parameter associated with a reflection of an output signal emitted by the second radar sensor from a given location within the sub-surface detection zone;

populating, with the computing system, a second matrix including a plurality of cells with the plurality of second data points such that each second data point is placed within a cell corresponding to the given location within the sub-surface detection zone;

determining, with the computing system, a correlation between the first and second matrices;

determining, with the computing system, a location of the seed based on the determined correlation between the first and second matrices; and controlling, with the computing system, an operation of the seed-planting implement based on the determined location of the seed.

17. The method of claim 16, wherein determining the correlation comprises:

comparing, with the computing system, the generated first matrix to the generated second matrix to determine the location of the seed.

18. The method of claim 16, wherein determining the correlation comprises:

determining, with the computing system, a plurality of correlation values, each correlation value being indicative of a correlation between the parameter of a given cell in the first matrix and a parameter of a cell at a corresponding location within the second matrix.

19. The method of claim 18, wherein determining the location of the seed comprises:

determining, with the computing system, a minimum correlation value of the plurality of plurality of correlation values; and determining, with the computing system, the location of the seed based on a location of the cells having the minimum correlation value within the first matrix and the second matrix.

20. The method of claim 18, wherein determining the location of the seed comprises:

comparing, with the computing system, a given correlation value to a threshold value; and disregarding, with the computing system, as clutter the parameter value of a cell within the first matrix and the parameter value of a cell within the second matrix corresponding to the given correlation value when the given correlation value exceeds the threshold value.

* * * * *